No. 657,265. Patented Sept. 4, 1900.
J. L. CHAPMAN.
STEAM TRAP.
(Application filed June 26, 1900.)
(No Model.)
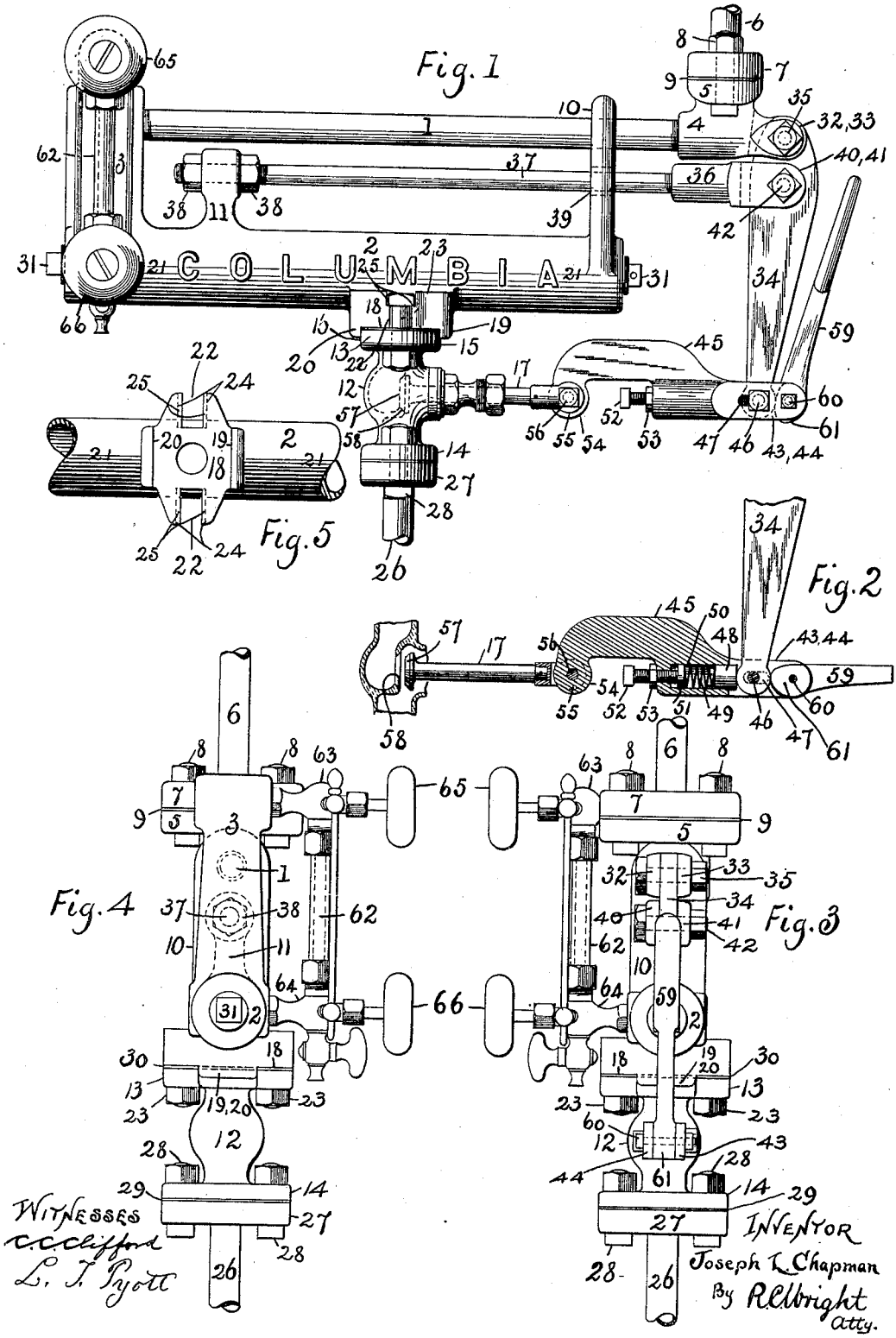

UNITED STATES PATENT OFFICE.

JOSEPH L. CHAPMAN, OF HADDONFIELD, NEW JERSEY, ASSIGNOR TO WATSON & McDANIEL CO., OF PHILADELPHIA, PENNSYLVANIA.

STEAM-TRAP.

SPECIFICATION forming part of Letters Patent No. 657,265, dated September 4, 1900.

Application filed June 26, 1900. Serial No. 21,682. (No model.)

*To all whom it may concern:*

Be it known that I, JOSEPH L. CHAPMAN, a citizen of the United States, residing at Haddonfield, in the county of Camden and State of New Jersey, have invented certain new and useful Improvements in Steam-Traps, of which the following is a specification.

My invention is an improvement in expansion steam-traps, and especially on my Patent No. 518,053, of April 10, 1894. By reference to my former patent it will be seen that my only means of releasing the outlet-valve by hand for the purpose of blowing steam through the trap or for releasing the water of condensation or blowing away any unusual amount of dirt deposit under or near the valve was by unscrewing the outer nut $F^3$ to release the rod F and then screwing the inner nut $F^3$ up against cross-head E. (See my former patent, Fig. 1.) By so doing I had a means by which I could hold the valve M open irrespective of any automatic action of the trap, or by simply loosening the outer nut $F^3$ the lever G could be worked by hand to unseat the valve M. The above means is objectionable, too slow, sometimes not thoroughly understood by the operator, who may not have the necessary wrench at hand, and the parts are liable to be too greatly heated for convenient handling. Therefore in my present invention I have introduced mechanism to overcome the above disadvantages by the use of a hand-lever, which has but slight contact with any heated parts and which is constructed and attached in a manner to hold the valve open by hand or to lock it open for any desired length of time by the simple pulling down of a lever, which the operator does not have to be especially instructed about, as in the former construction, where the nuts were required to be slackened and tightened. I also now secure the outlet-valve case in positive alinement and exact elevation and in a manner for its easy attachment or removal; also, the inlet-pipe is now secured without any screw-fitted steam-joint. The valve-stem-spring mechanism now has a means for its adjustment and other improvements for better construction, which are further described in the specification and illustrated in the accompanying drawings, in which—

Figure 1 is a side elevation. Fig. 2 is a vertical central section of my adjustable and yielding valve-stem-connection mechanism. Fig. 3 is an elevation from the lever end. Fig. 4 is an elevation of the opposite or gage-glass end. Fig. 5 is an underneath view of the outlet-valve seat on the low-expansion tube.

In each view similar figures of reference indicate similar parts.

As in my original invention, I employ a brass or copper expanding-tube 1 and an iron tube 2; but in this instance I have constructed upwardly from one end of tube 2 a hollow column 3, into which one end of tube 1 is secured, while at the other end of the tube I secure an inlet-head 4, having a flange 5, whereto is secured an inlet-pipe 6 by flange 7, held by bolts 8 and having a compressible gasket 9. This construction is much preferable to the screw-joint employed in the former trap, as being more secure and affording the advantage of placing or displacing the trap without disturbing the inlet-pipe whenever erection, repairs, or inspection are necessary. A guide 10 is erected on the lever end of pipe 2 and the pipe 1 is guided and held therethrough.

It was found that parts E F $F^3$ in my former construction were very liable to be deranged or broken in shipment, shop-handling, and storing. Therefore to avoid such annoyance and loss I have now constructed lug 11 within column 3 and upwardly from tube 2, where it is protected by tubes 1 and 2 from injury. I have also improved the attachment of the outlet or delivery-valve cage 12 by making a flange 13 at its upper side and a flange 14 at its under side, the flange 13 being parallel-sided at its front edge 15 with its back edge 16, and these edges made a true right angle to the center line of valve-stem 17. Flange 13 is seated in a pocket 18 on tube 2, the side ledges 19 20 being at a right angle to center line 21 of tube 2, so that the valve-stem must always be positively in line with center line 21 of pipe 2 and at exactly a predetermined distance below it, so the valve cannot carelessly be attached to cause any binding or friction on stem 17 when coupled to its operating connections, which insures a mechanism sensitive to any variations of expansion.

Slots 22 permit free insertion of bolts 23, while the widened part 24 prevents the bolt-heads from turning and forms seats 25 to receive the bolt-heads. This construction allows the placing or displacing of valve cage or case 12 by simply removing one bolt, which is much preferable to a screw-thread joint, which with frequent use becomes loose and leaky and the necessary disturbance of the line of pipe in which they are used. Drain-pipe 26 is secured to flange 27 and held by bolts 28 to valve-cage 12, and a gasket 29 below and 30 above cage 12 insure tight joints. Plugs 31 are screwed in each end of pipe 2 and afford a means to thoroughly cleanse the tube of any sediment.

Inlet-head 4 has a jaw formed by lugs 32 33, in which is inserted lever 34, held by bolt 35, and below is fulcrum-head 36, secured to fulcrum-rod 37, which is secured at its opposite end to lug 11 by nuts 38. Rod 37 passes through a free hole 39 in guide 10, and lever 34 is secured in the jaw formed by lugs 40 41 of head 36 by bolt 42. The lower end of lever 34 is inserted in a jaw formed between lugs 43 44 of valve-stem connection 45 and secured by the bolt 46, which passes through the slotted hole 47 in lugs 43 44. The lower end of lever 34 is circularly formed, and at its inner edge it abuts a spring-seat 48, bearing against a spring 49, inserted in pocket 50, formed in valve-stem connection 45. A follower 51 is placed at the opposite or inner end of spring 49, the follower being controlled by adjusting-screw 52, which is screwed through the end of pocket 50 against follower 51 and has a jam-nut 53 above screw 52. The connection 45 is carried upward to give clearance for working the screw and thence backward and downward, forming an end 54, which is secured to jaw 55 of valve-stem 17 by bolt 56.

In my former construction I had much trouble with the springs owing to their variations of power, loss of set, and unequal elasticity, and the construction was also faulty, as no means existed to set the valves to carry a predetermined pressure in the trap suited to the different uses and conditions incident to the use of the trap; but my present construction overcomes the former defects, as I am enabled to adjust the spring to different conditions and uses and to any pressure desired.

I have found it very necessary and desirable to unseat valve 57 and open the trap independently of the contracting of tube 1, and it is also very desirable to know positively that the trap is properly working by actual test, and for such purpose I have inserted in jaws 43 44 outside of lever 34 a hand-lever 59, held by bolt 60. The hand-lever 59 normally stands away from the lever 34, as seen in Fig. 1, to keep it cool and have room to grasp it by hand and it is provided at its lower end with a cam 61, which upon its outer and lower edge is concentric with its center, while its inner edge is flattened and lies close to the circular lower end of lever 34 when in its inactive position, as seen in Fig. 1. When the hand-lever is thrown down, as seen in Fig. 2, the flattened side of cam 61 leaves the end of lever 34 and the concentric part is forced against the end of lever 34, which forces connection 45 back, the slots 47 permitting such action. Spring 49 is now compressed and valve 57 leaves its seat 58. When the hand-lever is forced to a horizontal or lower position, the valve 57 will be continuously held open until the lever is moved up. To still further insure the knowledge as to the traps working or determine the presence or absence of the water of condensation therein, I have so formed column 3 that I am enabled to attach a glass water-gage 62 by tapping its valves 63 64 into column 3, the gage having hand-wheels 65 66 to open and close the valves. Any suitable construction of gage may be used on column 3, provided it has visual means to determine the presence or absence of condensation. As in my previous construction, tube 1 is preferably made of brass or copper on account of its greater coefficient of expansion over iron, and tube 2 is made of iron for likewise reverse reason. They are rigidly secured at one and the same end, and when heated by the flow of steam through the pipes causes tube 1, owing to its greater expansion and the gain in movement by the lever 34, to operate the connected mechanism and close the valve 57. As condensation takes place the accumulation of water cools and contracts pipe 1, and thereby discharges the accumulation by a reverse movement of lever 34, which through its connections and attachments opens valve 57. When it is necessary or desirable to blow steam through the trap or whatever it is attached to, the hand-lever 59 can be held so as to give a slight discharge, or it can be moved down to its self-locking position for a more free or continuous discharge. The lever also affords a means to open the valve and dislodge any foreign substance which may have lodged between valve 57 and its seat 58.

I claim—

1. In an expansion steam-trap, a tube of high expansive power, a tube of low expansive power, a connection for the tubes at one end and whereby they are rigidly held, an inlet to the high-expansion tube and a lever secured thereto at its short end, a fulcrum for the lever, a drain-valve flat-seated on the low-expansion tube, a stem for the valve, a yielding connection from the stem to the long end of the lever aforesaid, means to adjust the yielding connection and vary the pressure on the valve, and a hand-lever secured to the yielding connection in manner to force the valve open, for long or short periods of time.

2. In a steam-trap, a tube of high expansion, a tube of low expansion, means to connect the high-expansion tube to the low-expansion tube and drain it thereby, an inlet to the high-expansion tube connected thereto by flat-seated flanges and a compressible gasket, a lug upon the low-expansion tube, a fulcrum secured thereto, a lever secured to the fulcrum and to the high-expansion tube; a valve to drain the low-expansion tube, flat-seated thereon and having a compressible gasket, a stem for the valve, a yielding connection from the stem to the lever aforesaid, means to adjust the yielding connection, a hand-lever pivotally supported to the yielding connection and formed at its pivotal end to outwardly force the yielding connection, compress its yielding means, shorten the distance between the lever connected to the high-expansion tube and the valve, and open the valve when the hand-lever is moved down toward its horizontal position and when reaching its horizontal position hold and lock the valve open.

3. In an expansion steam-trap, a tube of high expansive power, a tube of low expansive power, each tube secured firmly at one end and thereby connected for expansion in a direct and parallel line, an inlet to the high-expansion tube, an outlet and a valve controlling the outlet from the low-expansion tube, a seat upon the tube formed in a manner to seat and secure the valve so that its stem shall be in parallel alinement horizontally and vertically to the center of the low-expansion tube, a lever attached at one end to the high-expansion tube, an adjustable fulcrum for the lever, a yielding and adjustable connection from the lever to the valve, and means for its adjustment, a hand-lever pivotally secured to the valve connection and having at its pivotal connection means to open the valve as the handle is moved down, and when at or below a line parallel to the center line of the low-expansion tube means to lock and hold the valve open until the handle is again lifted to its normal position.

In testimony whereof I affix my signature in presence of two witnesses.

JOSEPH L. CHAPMAN.

Witnesses:
W. H. ALCOCK,
R. C. WRIGHT.